US008869515B2

(12) United States Patent
Charial et al.

(10) Patent No.: US 8,869,515 B2
(45) Date of Patent: Oct. 28, 2014

(54) METHOD FOR CONTROLLING POLLUTANT EMISSIONS FROM A COMBUSTION ENGINE

(75) Inventors: Christophe Charial, Jouars-Pontchartrain (FR); Clement Grise, Paris (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 204 days.

(21) Appl. No.: 13/509,923

(22) PCT Filed: Oct. 18, 2010

(86) PCT No.: PCT/FR2010/052205
§ 371 (c)(1),
(2), (4) Date: May 15, 2012

(87) PCT Pub. No.: WO2011/061423
PCT Pub. Date: May 26, 2011

(65) Prior Publication Data
US 2012/0222404 A1 Sep. 6, 2012

(30) Foreign Application Priority Data
Nov. 17, 2009 (FR) .................................. 09 58102

(51) Int. Cl.
| F01N 3/00 | (2006.01) |
| F01N 9/00 | (2006.01) |
| F01N 11/00 | (2006.01) |
| F01N 3/20 | (2006.01) |
| F01N 3/10 | (2006.01) |
| F01N 3/021 | (2006.01) |

(52) U.S. Cl.
CPC . *F01N 9/00* (2013.01); *Y02T 10/24* (2013.01); *F01N 2900/0412* (2013.01); *F01N 2610/146* (2013.01); *F01N 2900/1621* (2013.01); *F01N 11/00* (2013.01); *F01N 2900/0418* (2013.01); *Y02T 10/47* (2013.01); *F01N 2330/06* (2013.01); *F01N 2900/1602* (2013.01); *F01N 2900/1402* (2013.01); *F01N 2560/026* (2013.01); *F01N 2900/0422* (2013.01); *F01N 2560/06* (2013.01); *F01N 9/005* (2013.01); *F01N 3/208* (2013.01); *F01N 3/2066* (2013.01); *F01N 2250/02* (2013.01); *F01N 2610/02* (2013.01); *F01N 2900/0408* (2013.01); *F01N 2570/14* (2013.01); *F01N 3/106* (2013.01); *F01N 2900/1622* (2013.01); *F01N 3/021* (2013.01); *F01N 2550/02* (2013.01); *F01N 2900/14* (2013.01)
USPC ..................... 60/295; 60/274; 60/277; 60/299

(58) Field of Classification Search
USPC .................................................... 60/272–324
See application file for complete search history.

(56) References Cited

U.S. PATENT DOCUMENTS
6,928,359 B2 * 8/2005 Xu et al. ......................... 701/102
6,981,368 B2 * 1/2006 van Nieuwstadt et al. ..... 60/277
(Continued)

FOREIGN PATENT DOCUMENTS
EP 1024254 A2 8/2000
WO 2009135071 A2 11/2009

OTHER PUBLICATIONS
International Search Report corresponding to International Application No. PCT/FR2010/052205, mailed Mar. 21, 2011.

*Primary Examiner* — Jesse Bogue
(74) *Attorney, Agent, or Firm* — Polser, Lieder, Woodruff & Lucchesi, L.C.

(57) ABSTRACT

The invention relates to a method for controlling a system for treating NOx in an exhaust line of an internal combustion engine, said system comprising means for introducing a reducing agent into the exhaust line upstream of an NOx reduction catalyst. The invention is characterized in that it consists in estimating the efficiency of the treatment in relation to a maximum conversion potential obtained if the ratio between the quantity of injected reducer and the quantity of NOx in the gas complies with a given set value and if the mass of reducing agent stored in the catalyst complies with a given storage set value.

11 Claims, 4 Drawing Sheets

(56) References Cited

U.S. PATENT DOCUMENTS

| | | | |
|---|---|---|---|
| 7,707,824 B2* | 5/2010 | Solbrig | 60/286 |
| 8,505,278 B2* | 8/2013 | Farrell et al. | 60/285 |
| 8,596,042 B2* | 12/2013 | Parmentier et al. | 60/286 |
| 2009/0044517 A1* | 2/2009 | Oba | 60/285 |
| 2009/0158710 A1 | 6/2009 | Suzuki | |
| 2009/0266058 A1* | 10/2009 | Kesse et al. | 60/295 |
| 2009/0272102 A1* | 11/2009 | Ofoli et al. | 60/286 |
| 2010/0242440 A1* | 9/2010 | Garimella et al. | 60/276 |
| 2010/0242454 A1* | 9/2010 | Holderbaum | 60/301 |
| 2012/0227383 A1* | 9/2012 | Charial et al. | 60/274 |

* cited by examiner

METHOD FOR CONTROLLING POLLUTANT EMISSIONS FROM A COMBUSTION ENGINE

CROSS-REFERENCE TO RELATED APPLICATIONS

The present invention is the US National Stage under 37 C.F.R. §371 of International Application No. PCT/FR2010/052205 filed Oct. 18, 2010 and which claims the priority to French application 0958102 filed Nov. 17, 2009, the content of which (text, drawings and claims) is incorporated herein by reference.

BACKGROUND

The present invention relates to a method for controlling polluting emissions from an internal combustion engine.

The use of fossil fuel, such as petroleum or coal, in a combustion system, in particular as the fuel in an engine, entails the production of a substantial quantity of pollutants which can be discharged through the exhaust and cause damage to the environment. Among these pollutants, nitrogen oxides (called NOx) pose a particular problem since these gases are suspected of being one of the factors contributing to the formation of acid rain and deforestation. Furthermore, NOx are linked to human health problems and are a key element in the formation of "smog" (pollution clouds) in cities. Legislation imposes ever more strict levels for their reduction and/or their elimination from fixed or mobile sources.

Among the pollutants that the legislation tends to regulate more strictly are soot or other particular materials resulting, in essence, from incomplete combustion of fuel, more particularly when the engine is operated in poor mixture, in other words with excess oxygen (air) relative to the stoichiometry of the combustion reaction. Poor mixtures are used in so-called diesel engines, ignited by compression.

Different means and strategies for pollution control are employed for these two broad categories of pollutants.

To limit the particle emissions, the technology of particle filters is little by little becoming common practice for all vehicles equipped with a diesel engine. This technology consists mainly in forcing the exhaust gas to pass through the porous channels of a ceramic honeycomb structure. The soot filtered in this way is accumulated and then eliminated in a regeneration operation of the filter during which the soot is burned. To obtain this regeneration, however, it is necessary to increase the temperature of the exhaust gas, which is typically obtained by enriching the exhaust gas with fuel (injected directly in the discharge line or in the combustion chamber of the engine, during the discharge phase of the combustion cycle) and/or by increasing the charge of the engine. A catalytic agent is used to facilitate the combustion of soot. This agent is either permanently deposited in the filter channels, or introduced as an additive with the fuel; this last technology allows for operating at lower temperatures than those required with catalytic filters.

To limit NOx emissions, the main solution implemented in current vehicles is the reduction of emissions at the source; in other words, operating the engine in such conditions that the rate of NOx produced is less than the limit rate. These conditions are, in particular, obtained by controlling in a very precise manner the different parameters of the engine, starting from the parameters of fuel injection and reinjection at admission of part of the exhaust gas, thus reducing the oxygen concentration favoring the formation of nitrogen oxides.

However, it is not possible to drastically reduce the emissions at the source without limiting certain engine performances. For this reason, different solutions have been proposed for denitrifying exhaust gas. One solution which has provided proof of its effectiveness, specifically for heavy trucks, is the chemical conversion by reduction of nitrogen oxides by means of a reducing agent injected directly in the exhaust line. A post-treatment solution which has provided proof of its effectiveness is the use of ammonia ($NH_3$), such as aqueous urea. Ammonia reacts with NOx on a catalyst to form inert nitrogen ($N_2$) and water ($H_2O$). This solution is mainly known under its English acronym SCR or "Selective Catalytic Reduction".

A commonly used reducer is ammonia, stored in the form of urea, whereby the ammonia is obtained by thermolysis/hydrolysis of urea in the exhaust line according to the following reactions:

$$(NH_2)_2C \rightarrow HNCO + NH_3 \text{:thermolysis at } 120°C. \quad (1)$$

$$HNCO + H_2O \rightarrow CO_2 + NH_3 \text{:hydrolysis at } 180°C. \quad (2)$$

The SCR catalyst then serves to facilitate the reduction of NOx by $NH_3$ according to the three (3) following reactions:

$$4NH_3 + 4NO + O_2 \rightarrow 4N_2 + 6H_2O \quad (3)$$

$$2NH_3 + NO + NO_2 \rightarrow 2N_2 + 3H_2O \quad (4)$$

$$8NH_3 + 6NO_2 \rightarrow 7N_2 + 12H_2O \quad (5)$$

Since ammonia is considered a toxic gas, it is important that the quantity of injected urea is at all times based to the quantity of nitrogen oxides to be treated.

A simple closed loop control essentially based on the information provided by a NOx sensor installed downstream of the NOx trap is excluded for an engine operating predominantly at transitory speeds, such as the engine of an automotive vehicle.

However, the NOx quantity can be estimated by mapping nitrogen oxide emissions as a function of the engine operating conditions, in other words, essentially as a function of speed and torque requirements.

In practice however, the precise adjustment of the quantity of urea to be injected poses numerous difficulties. Indeed, the ammonia available for the reaction is the ammonia "stored" at any given time in the catalyst. The higher the temperature of the exhaust gas, the lower the ammonia storing capacity of the catalyst, since a desorption reaction is competing with an adsorption reaction. On the other hand, this temperature increase tends to promote the kinetics of the reaction, and therefore to favor reducing reactions. In these conditions, emissions are difficult to precisely control.

In these conditions, the information provided by the NOx sensor downstream of the catalyst can be used to verify that the system functions normally, and to trigger an alarm if a malfunction appears. According to the prevailing rules in Europe, the NOx emission threshold is measured over a whole cycle of normalized driving, designated by the acronym NEDC ("New European Driving Cycle"). If the emission threshold is reached, it must be signaled to the driver through an indicator light and recorded in a fault memory, because beyond this threshold the SCR system is considered as failing.

Before reaching these thresholds, measures can be taken to compensate for a drift in the signal, for instance by taking into account an assumed aging of the catalyst, for instance by replacing the original injection map with a new map more suitable for a system at the end of its life.

But a great difficulty exists in that the thresholds are defined relative to averages, with emission ceilings expressed in gram per kilometer driven, while the driving conditions of the vehicle are normally not constant. Even if the driver has activated speed control, the engine torque may vary due to the start of a climate control compressor or more simply, due to a variation in road conditions (slope and surface).

It is therefore desirable to provide a means for detecting in real time abnormal operation of the SCR system, without necessarily considering an instantaneous drift of emissions as a sign of such malfunction.

BRIEF SUMMARY

To overcome some of these difficulties, a method and system is proposed for controlling a system for treating NOx present in the exhaust line of an internal combustion engine. The system comprises means for introducing a reducing agent in the exhaust line upstream of the NOx reduction catalyst, wherein the effectiveness of the treatment is estimated relative to a maximum conversion potential obtained if the ratio between the quantity of injected reducing agent and the NOx quantity in the gas meets a given ratio set point and if the mass of reducing agent stored in the catalyst meets a given storage set point.

In a variant, the mass of reducer stored in the catalyst is estimated based on a basic mapping function of the temperature of the exhaust gas and an $NO_2/NO$ ratio.

Advantageously, the mass of reducing agent stored in the catalyst is estimated by integrating as a function of time the storage rate of the ammonia injected in the line and the depletion speed of ammonia through NOx reaction by imposing as a condition to the limits that the mass of reducing agent cannot be smaller than 0.

This storage rate can be estimated as being uniquely dependent on the quantity of ammonia injected in the line.

The depletion rate can be estimated assuming that the stoichiometric ratio $R_{NH3/NOx}$ of the NOx conversion reaction by ammonia depends on the NO2/NO ratio in the following manner:

If $R_{NO2/NO} < 0.50$ then $R_{NH3/NOx} = 1$,

Otherwise $$R_{NH3/NOx} = \frac{1 + 8(R_{NO2/NO} - 0.50)}{1 + 6(R_{NO2/NO} - 0.50)}.$$

In a variant of the method, for a given type of SCR catalyst, the maximum conversion potential is estimated starting from a mapping function of the temperature of the SCR reduction catalyst and of the $NO_2/NO$ ratio at the inlet of the SCR catalyst.

Advantageously, this $NO_2/NO$ ratio is estimated starting from a mapping function of the temperature and of the residence time of the exhaust gas in an oxidation catalyst installed upstream in the exhaust line, upstream of the SCR catalyst.

The value estimated starting from the mapping function of the residence time of the exhaust gas in the oxidation catalyst DOC can be corrected by a factor depending on the aging status of the catalyst DOC.

This aging factor can be defined as the ratio between the accumulated exposure time beyond a first critical temperature causing a degradation of the oxidation catalyst and a reference exposure time to the first critical temperature, for which the degradation of the catalyst is complete.

Advantageously, if the catalyst is exposed to a second critical temperature, higher than the first critical temperature, the exposure times can be multiplied by a correction factor greater than 1.

The residence time of the exhaust gas in the oxidation catalyst DOC can be estimated starting from the temperature and the pressure of the exhaust gas at the outlet of the oxidation catalyst and the flow of the exhaust gas upstream of the oxidation catalyst.

DESCRIPTION OF THE DRAWINGS

Other details and advantageous characteristics of the method and system will become evident through the following detailed description with reference to the attached drawings which show.

DETAILED DESCRIPTION

It is noted that nitrogen oxides (NOx) refers to the two nitrogen compositions for which the emissions are regulated, namely nitrogen monoxide (NO) and nitrogen dioxide ($NO_2$), produced in particular by engines operating with poor mixtures, in other words with excess oxygen relative to the stoichiometry of the combustion reaction of the fuel, in this example in particular compression ignition engines, or diesel engines.

For clarity purposes, in the following description the hypothesis is systematically made that the reducing agent is injected as is in the exhaust line, upstream of the SCR catalyst. This is, for instance, the case if this agent of hydrogen or ammonia is stored in gaseous form or produced in a suitable generator before being introduced in controlled manner in the exhaust line. However, this injected agent can also be introduced in the form of a precursor, such as the well known example of urea, which after a thermolysis and hydrolysis reaction, is transformed in ammonia. (See the equations 1 and 2 shown above).

In addition, it is assumed that this reducing agent is effectively ammonia, and for clarity purposes, the designation ($NH_3$) is used systematically in the following description, even though the claimed invention is not limited to this embodiment (i.e., it is not limited to the use of $NH_3$ as the reducing agent).

Figure 1:
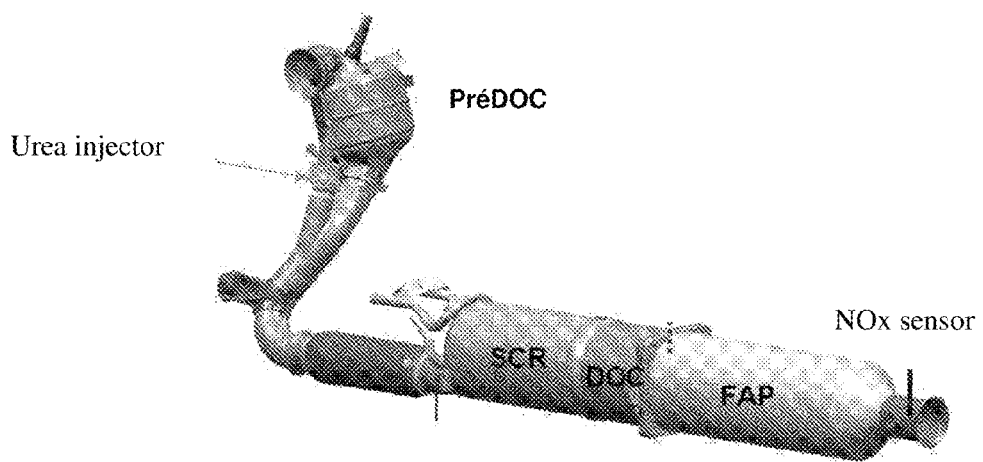
FIG. 1 is a schematic view of an engine and its exhaust gas treatment line.

FIG. 1 is a schematic view of an engine and its exhaust gas treatment line. An oxidation catalyst DOC is installed at the beginning of the line. Its primary role is to convert, in the combustion chambers of the engine, the carbon monoxide, and the fraction of unburned or partially burned gaseous hydrocarbons, to carbon dioxide. Such disposition, close to the engine, in the hottest area of the exhaust line, guarantees maximum efficiency of the catalyst, but is not part of the specific scope of the claimed invention.

Continuing in the direction of the exhaust gas flow, we note the presence of a temperature sensor which allows for estimating the exhaust gas temperature upstream of the SCR treatment system.

This treatment system consists in essence of an injector, in communication with a source of reducing agent (not shown), and downstream of the injector, a selective reduction catalyst, called an SCR catalyst. As is well known, the SCR catalyst can be made of a zeolite deposited on a ceramic support, for instance of cordierite type. This type of zeolite-based catalyst hardly promotes the conversion reaction of NO to $NO_2$. On the other hand, other catalysts containing platinum or palladium favor this conversion more.

If the reducing agent is not injected directly in its final form, but in the form of a precursor, for instance as an aqueous solution of urea, the system can also comprise a means suitable to facilitate the mixture of the precursor in the exhaust gas while allowing for a relatively compact line architecture.

A particle trap FAP is also present in this line, installed in the present case downstream of the selective reduction catalyst, but it can also be installed upstream of the injector.

Finally, a NOx sensor is provided in order to ensure that the emissions of the vehicle are always less than the emission standard in effect.

In the rest of this document we will note with the suffix 0, data at a point upstream of the oxidation catalyst DOC (but downstream of the branching point EGR of the gas), and with suffix 1, a point downstream of this catalyst DOC and upstream of the SCR catalyst.

The catalytic reduction of NOx by ammonia in a SCR catalyst consists essentially of a series of reactions numbered (3) to (5) mentioned above, whereby the NOx reacts in essence with ammonia stored in the catalyst at a given time.

At any time, one can calculate the efficiency of the system, that is to say, the ratio between, on the one hand, the difference between the NOx quantity emitted by the engine and the NOx quantity emitted at the end of the line, and on the other hand, the NOx quantity emitted by the engine.

The NOx quantity emitted at the end of the line is estimated by means of a NOx sensor mounted downstream of the treatment devices.

The NOx quantity emitted by the engine can be obtained starting from a map established on the basis of actual emission measurements at the outlet of the engine, typically on an engine test bench associated with a booth for quantitative chemical analysis of the exhaust gas.

During the regulation phase of the engine, a set of parameters can be defined for each operating point of the engine optimizing the performance and the emissions of the vehicle (which can be defined as a request for engine torque at a given engine speed). Among these parameters are, for instance, the quantity of injected fuel, the quantity of fresh air admitted in the engine, the fuel injection conditions, the valve opening timing, the exhaust gas recirculation rate (EGR), etc. These parameters are transmitted to the engine processor by means of a set of maps which take into consideration parameters such as exterior temperature, the altitude (to take into account the rarefaction of oxygen), the preheating state of the engine, etc. Since the regulated emissions of the vehicle are taken into account when defining the engine parameters, an instantaneous NOx mass flow will be obtained for this engine, for each engine operating point, and for given exterior conditions. If necessary, maps can be provided for degraded operating conditions, for example in the event of an absence of gas recirculation due to malfunction of the EGR valve.

The SCR system operates nominally if the observed efficiency conforms to a theoretical model of the system which defines the maximum conversion potential for the given conditions.

To create this model, it should be noted first that the reduction capacity of a catalyst is a function of its temperature and the nature of the gas to be treated, in other words, of the $NO_2/NO$ ratio noted in the following as $R_{NO2/NO}$.

As long as the minimum activation temperature is not reached (called Light-off temperature), the catalyst is essentially inert. Beyond that, its efficiency increases until a zone of optimum operation is reached. This efficiency is not universal but depends, of course, on the nature of the chemical substances to be treated, therefore in the specific case of exhaust gas treatment, on the ratio $R_{NO2/NO}$.

A—Determination of the $NO_2/NO$ Ratio at the Inlet of the Catalyst

In a first embodiment of the system and method, the ratio $R_{NO2/NO}$ can be estimated based on maps established during the regulation of the engine by analyzing the gas produced at the different operating points of the engine.

In practice, this analysis is relatively complicated, and most often it is simply based on determining the different substances, since the NOx fraction, which is a sum of $NO_2$ and NO, is considered as one part (as is the case with the existing regulatory standards, and the gas analysis is performed in simpler manner after complete oxidation of the gas, therefore total conversion of the NO fraction in $NO_2$). For this reason, one of the goals is to propose a means for estimating this ratio in a simpler manner.

Between the outlet of the engine and the catalytic reduction catalyst, oxidation of a portion of the NO is taking place in the oxidation catalyst DOC. For this reason, one of the goals is to propose a model for estimating the ratio $R_{NO2/NO}$, whereby this model is remarkable in that the ratio is estimated as a function of the residence time of the gas in the oxidation catalyst, and weighted according to an aging factor of the oxidation catalyst.

Figure 2:
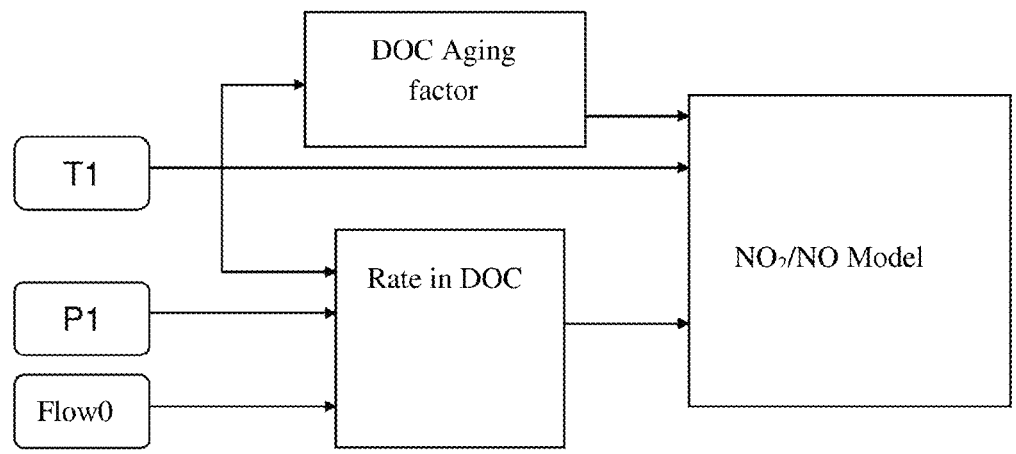
FIG. 2 is a block diagram illustrating the dependency between the estimation model of the $NO_2/NO$ ratio at the outlet of the oxidation catalyst.

This model corresponds in essence to the diagram proposed in FIG. 2 where only three (3) data inputs are shown: the estimated temperature and pressure at the outlet of the catalyst DOC and the exhaust gas flow upstream of the catalyst DOC are necessary to estimate the ratio $R_{NO2/NO}$ by means of 3 specific modules which allow for more precise calculation of the aging factor of the oxidation catalyst, the rate of the exhaust gas in the catalyst DOC and an estimation module for the $R_{NO2/NO}$ ratio starting from the result of these two preceding modules.

Aging Factor Module for the Oxidation Catalyst

According to the system and method, the aging can be estimated from a timer which sums the total elapsed time above a critical temperature beyond which the performance of the catalyst DOC is irrevocably degraded. Advantageously, when the temperature to which the catalyst is exposed is particularly high (higher than a second threshold temperature, higher than the critical temperature), the time spent beyond this second threshold temperature is multiplied, for instance, by 1.5.

A normalized time factor can then be defined as the ratio between this timer and a reference timer, corresponding to the accumulated exposure time beyond the critical temperature resulting in complete degradation of the catalyst DOC. If this timer reaches or surpasses this reference time, the aging factor will be set equal to 1. On the other hand, a new catalyst DOC, never exposed to a temperature beyond the reference temperature will have an aging factor equal to 0.

Residence Time of the Gas in the Oxidation Catalyst

Figure 3:
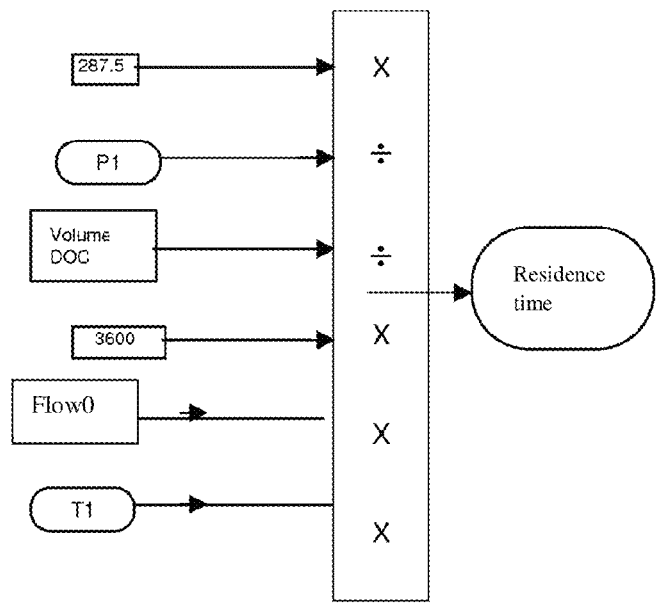
FIG. 3 is a diagram illustrating the calculation of the residence time of the exhaust gas in the oxidation catalyst.

The module is illustrated in FIG. 3 and is essentially based on the ideal gas law, with three input data, the temperature T1 (expressed in ° Kelvin), and the pressure P1 downstream of the oxidation catalyst (expressed in Pascals) and the flow of exhaust gas upstream of the catalyst (expressed in g/s), in other words the gas flow produced by the engine, less the flow of gas admitted in the EGR circuit if the engine is equipped with such circuit and if the branching point of the EGR circuit is located upstream of the oxidation catalyst, in other words if the engine is equipped with a high pressure EGR circuit.

The calculation additionally requires knowledge of the volume V of the catalyst (volume of accessible gas, expressed in liters). In an ideal gas, the relation between the number n of moles of gas in a volume V at pressure P and temperature T is equal to RT/PV, R being the ideal gas constant. In the case of exhaust gas, the molar mass can be approximated at 29, considering that the latter is essentially constituted of products of the combustion of fuel with oxygen in the air which can be modeled by the reaction $C_7H_{16}+11O_2 \rightarrow 7CO_2+8H_2O$ and that the nitrogen in the air is found in the exhaust gas. From this, the mass of the gas in the Catalyst DOC is deduced.

Dividing the mass of the gas residing in the catalyst DOC by the upstream mass flow, an estimate is obtained of the residence time in the catalyst DOC, which by hypothesis is supposed to be identical for all gaseous substances present in the exhaust gas, including NOx.

Estimation of the Ratio $R_{NO2/NO}$ at the Outlet of the Oxidation Catalyst

During the residence in the oxidation catalyst DOC, part of the NOx oxidizes into $NO_2$. The reduction reactions that take place in the catalytic reduction catalyst occur with a gas enriched in $NO_2$. It is therefore necessary to estimate the $NO_2/NO$ ratio ($R_{NO2/NO}$) at the outlet of the oxidation catalyst DOC.

This ratio depends in part on the nature and the dimensions of the oxidation catalyst DOC, the aging status of the catalyst DOC and the residence time of the gas in the oxidation catalyst. We have shown previously how to estimate the aging factor and the sojourn time.

We have found that the ratio $NO_2/NO$ at the outlet of the oxidation catalyst can be considered as independent of the $NO_2/NO$ ratio at the inlet of the catalyst, and depends only on the oxidation capacity of the oxidation catalyst on the one hand and of the residence time of the gas in the catalyst on the other hand. For a given architecture choice, and a given aging state, the only parameter variable as a function of the operating conditions of the engine and affecting this oxidation capacity is the temperature in the catalyst.

Figure 4:
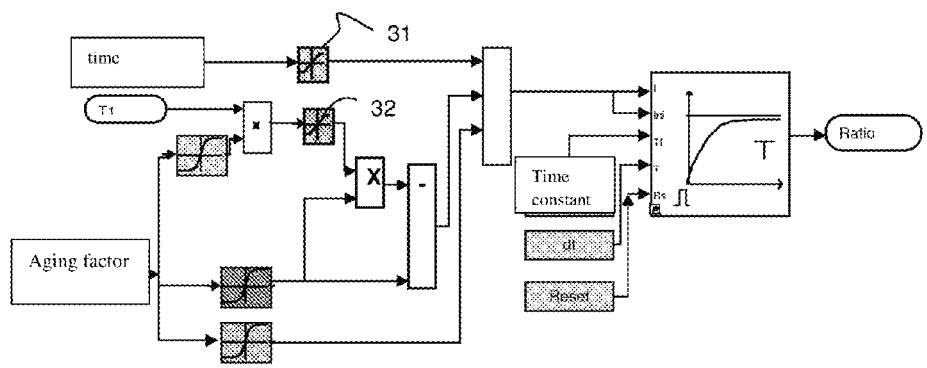
FIG. 4 is a schematic diagram of the estimation module of the $NO_2/NO$ ratio at the outlet of the oxidation catalyst.

FIG. 4 illustrates the estimating module of the $NO_2/NO$ ratio at the outlet of the oxidation catalyst.

A first map 31 is used to select a value for the $NO_2/NO$ ratio according to the residence time of the gas 32 in the Catalyst DOC. This value is corrected by a first correction factor, supplied by a second map as a function of the temperature downstream of the catalyst DOC. This first factor is for instance selected between 0 and 1.

The aging of the catalyst DOC affects at least two levels of its performance: on the one hand its ignition temperature increases, and on the other hand, beyond the ignition temperature, the oxidation capacity is degraded. Therefore, two specific maps can be used to test if the catalyst DOC operates in a suitable temperature range, and to assign a second correction factor, again selected between 0 and 1, to take into account this degradation of the oxidation capacity. Advantageously, this second correction factor can be different at low and high temperatures, to take into account that at low temperatures (just below the ignition temperature) the degradation is stronger than at higher temperatures, so that a lower temperature exacerbates the aging of the catalyst.

Finally the ratio is filtered by a first order low-pass filter to smooth the strong dynamics of the residence time, due to large variations of the flow in the exhaust line.

Once the $NO_2/NO$ ratio is estimated, it is possible to begin modeling the reduction in the SCR catalyst, since it is assumed that this ratio will not vary between the outlet of the oxidation catalyst DOC and the inlet of the reduction catalyst SCR.

B—Determination of the Mass of $NH_3$ Stored in the Catalyst

One mole of ammonia injected upstream of the catalyst can eventually be "trapped" by the SCR catalyst, transformed by reacting with the NOx or go through the SCR catalyst without being transformed and end up downstream of the $NH_3$ catalyst.

The reduction catalyst has high affinity for ammonia and beyond a certain minimum threshold charge of $NH_3$, the NOx reduction reaction by ammonia is not significantly catalyzed. Beyond a certain maximum threshold charge of $NH_3$, the storage capacity is exceeded and some ammonia is released by the catalyst. The ammonia released by the catalyst must be added to the ammonia coming from the reducer injector to avoid excess ammonia at the end of the exhaust line, adding to the emitted pollutants that we are trying to minimize.

The minimum and maximum thresholds depend on the temperature of the catalyst and are lower with increasing temperature.

Each temperature of the SCR catalyst corresponds therefore to an optimum storage set point, between the minimum and the maximum thresholds, which can be estimated as equal to the median between the minimum and maximum thresholds if it is desired to minimize the total number of embedded maps. At any time, the quantity of injected reducing agent is adjusted in such a manner as to stabilize the quantity of ammonia stored at this optimal set point level.

Note that the ammonia stored in the catalyst is not volatilized following a vehicle stop, so that the modeled mass can easily be stored in memory at the end of each driving phase to be used as initial mass for the following driving phase. To this end, a non-volatile memory can be used, for instance a programmable and electrically erasable read-only memory of EEPROM type (acronym for "Electrically Erasable Programmable Read-Only Memory").

The mass of $NH_3$ in the catalyst depends on the quantity of injected ammonia, and on the NOx quantity treated by the catalyst, in other words, the difference between the flow rates of NOx upstream and downstream of the catalyst. In other words, the mass of $NH_3$ in the catalyst is obtained by integrating the storage rate or depletion rate (by reaction of the NOx), while posing as a condition to the limits that the minimum mass is equal to 0 g. This storage rate mainly depends on the quantity of ammonia injected in the line. Assuming that the ammonia is injected in the form of an aqueous solution of 32.5% urea (by weight). It can be easily calculated that for each gram of solution, the catalyst is loaded with 0.184 g of catalyst.

The mass of $NH_3$ in the catalyst is decreased by the NOx mass reacting in it. This reacting mass of NOx is a function of the stoichiometric ratio. To obtain the mass of $NH_3$, it is sufficient to integrate the storage or depletion rate of $NH_3$ (the minimum mass being 0 g).

Figure 7:
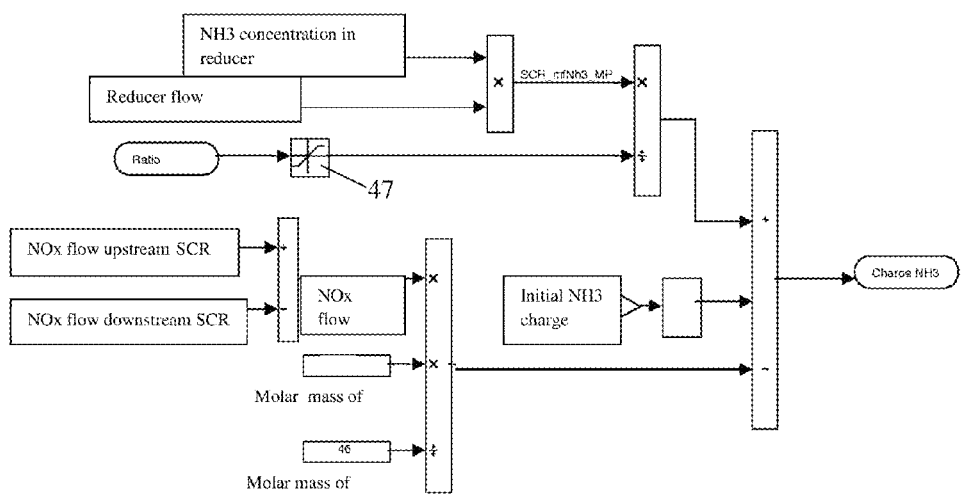
FIG. 7: is a block diagram of the calculation module for the ammonia charge in the catalyst.

FIG. 7 illustrates in more precise manner how this model can be implemented in a control module.

The mass of $NH_3$ modeled in the catalyst can also be reinitialized to a new value during a driving phase by the adaptive strategy or by calibration.

In addition to the quantity of ammonia stored in the catalyst, there is also at any given time a certain quantity of ammonia available for the NOx reduction reaction. If the ratio $R_{NO2/NO}$ is smaller than 0.5, it is estimated according to the method that one mole of nitrogen oxides (NO or $NO_2$) reacts with one mole of ammonia. If this ratio is greater than 0.5, more than one mole of nitrogen oxide reacts with one mole of ammonia, and a stoichiometric ratio noted $R_{NO2/NO}$ can be defined as follows:

If $R_{NO2/NO} < 0.5$ then $R_{NH3/NOx} = 1$

Otherwise $R_{NH3/NO} = (1+8(R_{NO2/NO}-0.50))/(1+6*(R_{NO2/NO}-0.50))$

C—Conversion Potential of the SCR Catalyst

The reduction capacity of the catalyst can only be expressed if the SCR catalyst is effectively at a temperature higher than its ignition temperature (e.g., on the order for a zeolite type catalyst . . . ), a condition which is not satisfied in the first moments following the start of the engine.

Finally, this capacity depends on the temperature of the SCR catalyst and on the $NO_2/NO$ ratio at the inlet of the catalyst.

Starting from an estimate of this NO2/NO ratio and the temperature of the catalyst, a maximum conversion potential can be defined, assuming that the target injection meets the ammonia storage target on the one hand, and the $R_{NH3/NOx}$ ratio on the other hand.

This maximum conversion potential reflects the actual instantaneous conditions. Therefore, the gap between the conversion potential and the observed efficiency reflects a malfunction of the system that can be taken into account practically in real time because it corresponds with instantaneous conditions which may not be momentarily favorable to proper conversion.

Figure 5:
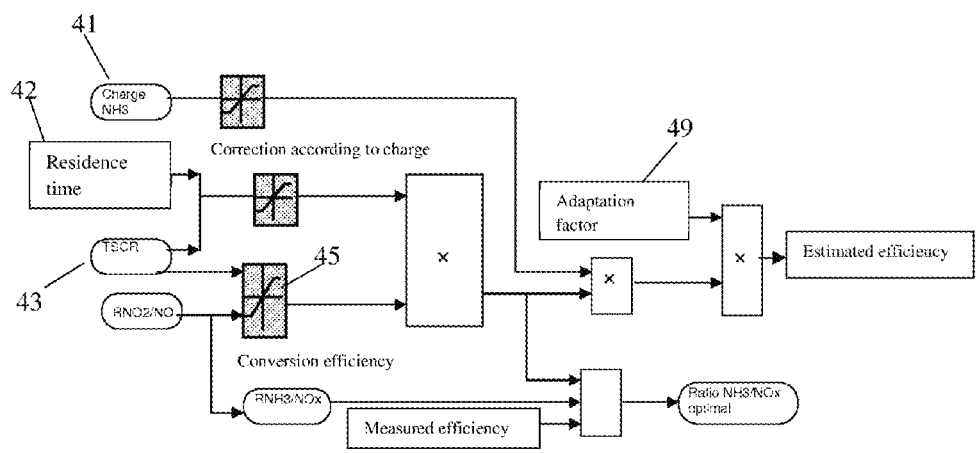
FIG. 5 is a schematic diagram of the calculation module of the SCR system efficiency.

FIG. 5 illustrates a possible use of this model. The input information consists of 4 elements: the initial ammonia charge 41, the residence time 42 of the exhaust gas in the SCR catalyst, the temperature of the SCR catalyst 43 and the $R_{NO2/NO}$ ratio.

The temperature of the SCR catalyst is not homogenous, either longitudinally or transversely. On the other hand, the SCR catalyst has a certain thermal inertia and its temperature cannot be confused with the temperature of the exhaust gas. As far as this model is concerned, it is only important that this temperature is estimated in a given point of the catalyst.

Figure 6:
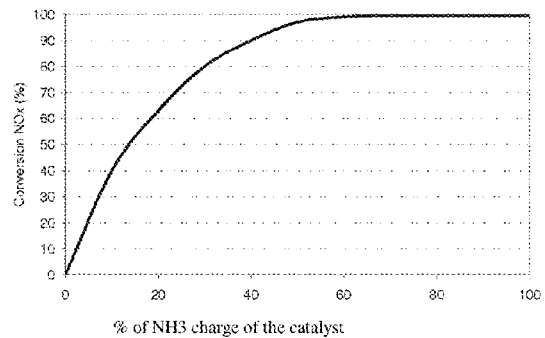
FIG. 6 is a graph showing variation of the SCR catalyst efficiency as a function of its ammonia charge.

FIG. 6 shows the variation of the efficiency of a SCR catalyst as a function of its ammonia charge. Therefore, the charge 41 can be converted by means of a map or a transfer function 45 into an estimated conversion potential.

This value must be corrected a first time to take into account the time that the gas resides in the catalyst and the temperature of the latter to reflect the fact that the kinetics of the reduction reaction is greater with a hotter catalyst and that the reaction requires a certain time lapse, so that if the residence time is shortened (higher exhaust gas flow due to higher engine speed) then the efficiency will be less at isothermal temperature. This correction is performed based on a factor between 0 and 1 obtained in 46.

As previously indicated, the NOx conversion efficiency depends also on the $NO_2/NO$ ratio, and another multiplication factor between 0 and 1 is therefore determined in 47, also starting from an appropriate map.

The combination of factors 46, 47 allows for the modulation of the conversion potential 45.

If necessary, as illustrated in FIG. 4, an adaptation factor 49 is also taken into account which reflects the fact that it is sometimes advantageous to select an injection quantity of ammonia smaller than the quantity which should give the best results, in order to ensure a minimum time interval between two fillings of the reducer reservoir.

The module also allows for estimating the conversion potential of the catalyst and comparing it with the observed nominal efficiency, and for decision making—such as the immobilization of the vehicle or the engine going into degraded mode—if it is judged that the system does not operate in nominal manner and requires maintenance to limit pollution risk.

This module can also be used to correct the ammonia charge set point as proposed in patent application FR2931201, according to which, when an anomaly of the SCR system is detected, whereby the measured efficiency is not conforming to the expectations according to the model and the quantity of reducing agent to be injected is modified, and if the employment of this method leads to a number of successive modifications of the same nature greater than a predetermined value N, the mathematical model is corrected, and the initial mathematical model is replaced by the corrected model.

The invention claimed is:

1. A method for controlling the treatment of NOx present in the exhaust line of an internal combustion engine, said system comprising an injector for introducing a reducing agent in the exhaust line upstream of the NOx reduction catalyst, the method comprising:

estimating a treatment efficiency relative to a maximum conversion potential obtained if the ratio between the quantity of injected reducing agent and the NOx quantity in the exhaust gas meets a given ratio set point and if the mass of reducing agent stored in the reduction catalyst meets a given storage set point;

estimating a mass of reducing agent is stored in the catalyst by integrating, as a function of time, the storage rate of the ammonia injected in the line and the depletion rate of the ammonia through NOx reaction; and wherein the depletion rate of the ammonia through the NOx reaction is estimated based on the $NO_2/NO$ ratio of the NOx as follows:

If $R_{NO2/NO} < 0.50$, then $R_{NH3/NOx} = 1$;

Otherwise, $$R_{NH3/NOx} = \frac{1 + 8(R_{NO2/NO} - 0.50)}{1 + 6(R_{NO2/NO} - 0.50)};$$

and adjusting the amount of reducing agent injected into the exhaust line based on the estimated efficiency.

2. The method according to claim 1, wherein the storage rate is estimated solely based on the quantity of ammonia injected in the exhaust line.

3. A method for controlling the treatment of NOx present in the exhaust line of an internal combustion engine, said system comprising an injector for introducing a reducing agent in the exhaust line upstream of the NOx reduction catalyst, the method comprising:

estimating a treatment efficiency relative to a maximum conversion potential obtained if the ratio between the quantity of injected reducing agent and the NOx quantity in the gas corresponds to a given ratio set point and if the mass of reducing agent stored in the reduction catalyst corresponds to a given storage set point;

adjusting the amount of reducing agent injected into the exhaust line based on the estimated efficiency; and estimating the mass of reducing agent that is stored in the catalyst on the basis of a base map as a function of the exhaust gas temperature and the $NO_2/NO$ ratio of the NOx; whereby:

the $NO_2/NO$ ratio of the NOx is estimated using a mapping function of the temperature of an oxidation catalyst and the residence time of the exhaust gas in the oxidation catalyst installed upstream in the exhaust line, upstream of the SCR catalyst and wherein a value estimated using a mapping function of the residence time of the exhaust gas in the oxidation catalyst is corrected by an aging factor depending on an aging state of the oxidation catalyst; and the aging factor is defined as a ratio between the accumulated time of exposure beyond a first critical temperature causing a degradation of the oxidation catalyst and a reference exposure time to the first critical temperature, for which the degradation of the catalyst is complete.

4. The method according to claim 3, wherein when the catalyst is exposed to a second critical temperature, higher than the first critical temperature, the exposure times are multiplied by a correction factor greater than 1.

5. The method according to claim 3, wherein for a given type of SCR catalyst, the maximum conversion potential is estimated using a mapping function of the temperature of the SCR reduction catalyst and the $NO_2/NO$ ratio of the NOx at the inlet of the SCR catalyst.

6. The method of claim 3 comprising storing in a memory the estimated mass of reducing agent stored in the catalyst.

7. The method of claim 6 wherein the estimated mass of reducing agent stored in memory is used as an initial mass of reducing agent during a next driving phase to estimate the mass of reducing agent stored in the catalyst.

8. A method for controlling the treatment of NOx present in the exhaust line of an internal combustion engine, said system comprising an injector for introducing a reducing agent in the exhaust line upstream of the NOx reduction catalyst, the method comprising:

estimating a treatment efficiency relative to a maximum conversion potential obtained if the ratio between the quantity of injected reducing agent and the NOx quantity in the gas corresponds to a given ratio set point and if the mass of reducing agent stored in the reduction catalyst corresponds to a given storage set point;

adjusting the amount of reducing agent injected into the exhaust line based on the estimated efficiency; and estimating the mass of reducing agent that is stored in the catalyst on the basis of a base map as a function of the exhaust gas temperature and the $NO_2/NO$ ratio of the NOx; whereby:

the $NO_2/NO$ ratio of the NOx is estimated using a mapping function of the temperature of an oxidation catalyst and the residence time of the exhaust gas in the oxidation catalyst installed upstream in the exhaust line, upstream of the SCR catalyst; and the residence time of the gas in the oxidation catalyst is estimated starting from the temperature and the pressure of the exhaust gas at the outlet of the oxidation catalyst and the exhaust gas flow upstream of the oxidation catalyst.

9. The method according to claim 8, wherein for a given type of SCR catalyst, the maximum conversion potential is estimated using a mapping function of the temperature of the SCR reduction catalyst and the $NO_2/NO$ ratio of the NOx at the inlet of the SCR catalyst.

10. The method of claim 8 comprising storing in a memory the estimated mass of reducing agent stored in the catalyst.

11. The method of claim 10 wherein the estimated mass of reducing agent stored in memory is used as an initial mass of reducing agent during a next driving phase to estimate the mass of reducing agent stored in the catalyst.

* * * * *